Jan. 20, 1970 R. DU BRUELER, JR 3,490,478

PURE FLUID PULSE CONVERTER

Filed Sept. 12, 1967

INVENTOR

RALPH DU BRUELER, Jr.

BY Hurvitz, Rose & Greene

ATTORNEYS 3,490,478
PURE FLUID PULSE CONVERTER
Ralph Du Brueler, Jr., Vienna, Va., assignor to Bowles Engineering Corporation, Silver Spring, Md., a corporation of Maryland
Filed Sept. 12, 1967, Ser. No. 667,175
Int. Cl. F15c 1/10; G06m 1/12
U.S. Cl. 137—81.5 15 Claims

ABSTRACT OF THE DISCLOSURE

A fluidic pulse converter comprises a pair of OR/NOR gates, a pair of fluid passages respectively connecting the NOR output passage of each of said gates to an input port of the other of said gates to maintain the gates in opposite logic states, said pair of fluid passages intersecting in the plane of the converter, and a commutating element having an input passage for receiving a series of input count pulses and a pair of output passages connected respectively to the aforesaid input ports of different ones of said OR/NOR gates, whereby a flow path for the "NOR" output fluid of the gates is provided between said input ports of said OR/NOR gates via the output passages of said commutating element to control the direction of flow of each count pulse toward the input port of the OR/NOR gate which is in its NOR condition and to bias such gate to enable it to respond quickly to input count pulses.

BACKGROUND OF THE INVENTION

The present invention relates to fluidic pulse converters and more particularly to a fluidic counter circuit for providing output pulses which alternate between first and second output passages in response to a series of sequential input pulses provided at a common input port.

Fluid pulse converters are well known in the prior art. An early converter is disclosed in U.S. Patent No. 3,001,698 to R. W. Warren and comprises a fluid amplifier having opposed control nozzles interconnected through a flow system such that a pressure differential is created across the ends of the flow system when the power jet of the amplifier more closely approaches one nozzle than the other. This pressure differential establishes a flow in the flow system and is used to steer sequential count pulses introduced into the flow system to said one control nozzle so that the power stream flowing between the nozzles is deflected by a count pulse toward the other control nozzle. The power stream is therefore alternately switched in response to successive count pulses. The problem with this converter is that it lacks the extreme reliability required in certain control or guidance systems. Specifically, the steering flow between control nozzles has been found to occasionally generate eddys adjacent the point of intersection of the input pulse. The eddys tend to direct an incoming count pulse toward the wrong control nozzle; that is, toward the control nozzle remote from the power stream. Various attempts to eliminate this problem have been made. One such attempt was to liberally vent the flow system in the region of critical interaction between the incoming count pulses and the steering flow between the control nozzles. Such venting has resulted in an improvement of reliability of the converter, but not a sufficient improvement to permit use in guidance and other long term high reliability systems.

Another attempt to solve the problem of reliability in a fluid pulse converter, is found in U.S. Patent No. 3,223,101 to R. E. Bowles. The approach employed in the Bowles patent is to utilize the output signals of a first binary type fluid amplifier to energize the control nozzles of a second fluid amplifier which has its power nozzle adapted to receive fluid count pulses. The control nozzles of the second amplifier bias the count pulses to the appropriate one of the output passages which are connected back to the first amplifier as respective control inputs. This feedback arrangement, while it does provide greater reliability than the Warren converter, requires a cross-over of the respective feedback passages and is awkward to manufacture and introduces undesirable space limitations. More specifically, the Bowles converter cannot be constructed with all of the fluid passages existing in a common plane, but rather requires a three dimensional approach to construction.

Still another approach is found in U.S. Patent No. 3,226,023 to B. M. Horton, and U.S. Patent No. 3,232,305 to E. Groeber. Both Groeber and Horton employ a bistable fluid amplifier to provide the converter output signals, portions of which are fed back to respective ones of a pair of fluid logic gates. The logic gates are biased by the fed back portion of the output signals to direct the input count pulses to the appropriate one of the control passages of the bistable fluid amplifier. This type of converter does, in fact, operate with high reliability; however, the improved reliability is achieved through a sacrifice in sensitivity. Specifically, the fed back signal is vented at the logic gate in the absence of an input count pulse. The vented flow tends to aspirate fluid from the passage which serves to conduct fluid from the logic gate to the control passage of the bistable amplifier. Aspiration tends to reduce the pressure in such passage. The power stream of the bistable amplifier also tends to aspirate fluid from the control nozzle at the other end of the same passage. The double aspiration action provides a substantially reduced pressure in the passage, which reduced pressure must be overcome by an incoming count pulse in order to deflect the power stream in the bistable amplifier, introducing a time delay into the system or requiring a very steep wavefront to maintain switching times. Also the pressure level required of the count pulse is greater than would be required if the passage in question were maintained at ambient pressure. Further, in this latter regard the input count pulses are divided between the two logic gates, therefore requiring twice the count pulse flow than is actually necessary to effect switching.

SUMMARY OF THE INVENTION

The pulse converter of the present invention comprises a pair of OR/NOR gates interconnected such that the NOR output passage of each gate is connected to the input port of another gate so as to maintain the gates in opposite logical states at all times by means of what is hereinafter termed feedback passages. The feedback passages intersect in the plane of the converter, yet are functionally isolated. A series of count pulses are applied to a commutating element having an input passage and a pair of output passages with each output passage connected to a respective one of the input ports of the OR/NOR gates. A fluid path is provided between the input ports of the respective OR/NOR gates via the output passages of the commutating element so that a NOR output signal from one of the OR/NOR gates, in addition to providing an input signal at the other OR/NOR gate, produces a fluid flow through the output passages of the commutating element back to the input port of said one OR/NOR gate. This latter flow hereinafter referred to as "priming flow," is maintained at a pressure level which is insufficient to deflect the power stream at said OR/NOR gate but is sufficiently great to direct an incoming count pulse to the output passage of the commutating element which is connected to said one OR/NOR gate. Thus the priming flow primes the commutating element to properly direct incoming count pulses and also biases the one OR/NOR gate such that only a small pressure increase is required to effect switching. The prebias feature of the present invention results in significant improvement in sensitivity and response time of the converter to input count pulses. The priming feature at the commutating element results in improved converter reliability over similar devices in the prior art.

It is therefore an object of the present invention to provide a fluid pulse converter having improved reliability, sensitivity and response time in which all fluid passages may be formed in a common plane.

It is another object of the present invention to provide a fluid pulse converter comprising a pair of fluid logic gates which are interconnected so as to be maintained in opposite logic conditions and wherein a priming flow path is provided between the output passage of one gate to the input port of the other gate and back to the input port of said one gate, the priming flow direction determining which gate receives an incoming count pulse.

It is still another object of the present invention to provide a fluid pulse converter which produces a self-biasing signal to minimize the count pulse level required to effect a change of state in the converter.

The above and still further objects, features and advantages of the present invention will become apparent upon consideration of the following detailed description of one specific embodiment thereof, especially when taken in conjunction with the accompanying drawing, wherein:

DESCRIPTION OF THE PREFERRED EMBODIMENTS

Figure 1:
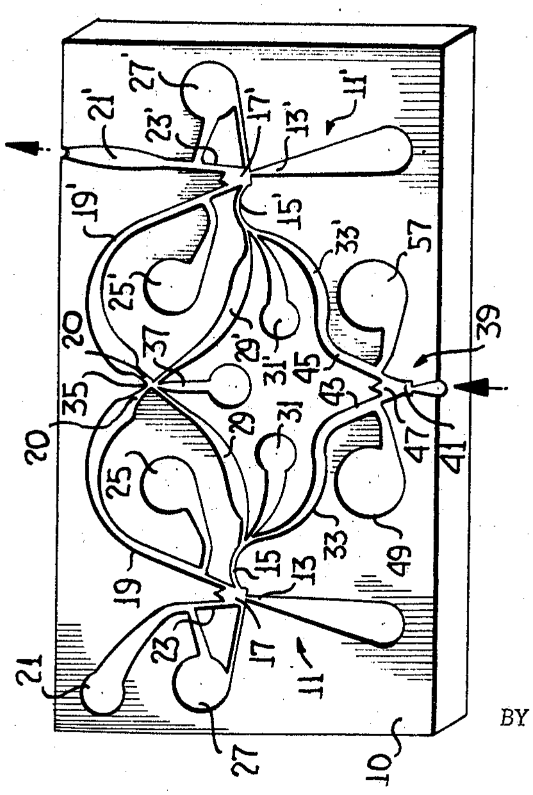
FIGURE 1 is a plan view of a fluid pulse converter constructed in accordance with the principles of the invention.

Referring now to the accompanying drawings, there is illustrated in FIGURE 1 a fluid pulse converter constructed in accordance with the principles of the present invention. The converter is formed in a flat plate of any suitable non-porous structurally rigid material such as metal, glass, plastic, or the like which is slotted in appropriate configurations to provide passages for fluid flow. The various passages may be formed in any suitable manner and may extend entirely through the plate 10 or may be a lesser depth as desired. It is to be understood that the material of plate 10 must be non-reactive with the fluid material flowing through the amplifier. Fluid flow is confined within the slots or passages by means of suitable enclosures, such as a cover plate or plates. The slots or passages for conducting fluid flow are preferably rectangular in cross section.

The converter comprises a pair of pure fluid OR/NOR gates 11 and 11' of the type generally described in U.S. Patent No. 3,240,063 to E.M. Dexter and D. R. Jones. For purposes of facilitating the following description, it is to be understood that gates 11 and 11' include identical elements which are designated by reference characters differing only in a prime associated with the element of amplifier 11'. Gates 11 comprises a power nozzle 13 arranged to issue a power stream into an interaction region 17 having a control nozzle 15 communicating therewith via one of its sidewalls. A pair of output passages 19 and 21 communicate with the downstream end of interaction chamber 17 on opposite sides of a flow divider 23. Vent passage 25 communicates with output passage 19. Vent passage 27 communicates with output passage 21 and with the interaction chamber 17 through an opening in the sidewall opposite control nozzle 15. As described in the above referenced Dexter et al. patent, the sidewalls of interaction chamber 17 are arranged such that boundary layer effects between the power stream and the sidewalls cause the power stream issuing from power nozzle 13 to be directed out of passage 19 in the absence of any input signals at control nozzle 15. In the presence of a control signal at nozzle 15 sufficient to overcome the boundary layer effects, the power stream is switched to output passage 21 and remains there for as long as the control signal remains at nozzle 15. Upon removal of the signal from the nozzle 15, the power stream returns to output passage 19 since the boundary layer effects on the left side of the element are quite small due to venting through vent 27. The output passage 19 may properly be termed a NOR output passage; that is the passage which receives the power stream in the absence of an input signal. Output passage 21 may properly be termed an OR output passage; that is an output passage which receives the power stream fluid only in the presence of an input signal.

Control nozzle 15 has communicating therewith three individual fluid conducting passages; a feedback passage 29; a reset passage 31; and a count pulse input passage 33. Feedback passage 29 communicates with a region 35 positioned intermediate gates 11 and 11' and entirely enclosed but for its communication with passage 29 and four other passages described below. NOR output passage 19' of OR/NOR gate 11' communicates with the region 35 at a location diametrically opposite feedback passage 29, whereby NOR output passage 19' transmits fluid to feedback passage 29 through region 35. Similarly, NOR output passage 19 of OR/NOR gate 11 is aligned with feedback passage 29' of OR/NOR gate 11' at diametrically opposed ends of region 35 to permit transmission of fluid from passage 19 to passage 29'. A vent passage 37 extends between an ambient pressure region and region 35 at a location intermediate feedback passages 29 and 29'. The width of vent passage 37 is sufficiently large to accommodate any flow from passage 19 which cannot be accommodated by passage 29' and to accommodate any flow from passage 19' which cannot be accommodated by passage 29. Vent passage 37 thus prevents flow of fluid from passage 19 to passage 29 and from passage 19' to passage 29', thereby serving to isolate the two flow paths defined by passages 19' and 29 and by passages 19 and 29'. The precise width of vent passage 37 required to effectively isolate these paths is, of course, dependent upon the widths of passages 19, 19', 29 and 29' and the geometry of the OR/NOR gate and the input pressure.

It will be appreciated that the presence of flow paths between the NOR output passages of each gate to the control nozzle of the other serves to maintain the OR/NOR gates 11 and 11' in opposite logic conditions. Specifically, if gate 11' is in its NOR condition, a signal is received at control nozzle 15 of gate 11 to maintain the latter in its OR condition. Similarly, a NOR output signal from NOR passage 19 of gate 11 is received at control nozzle 15' of gate 11' to maintain the latter in its OR condition.

A commutating element 39 comprises a fluid element having an input nozzle 41 for introducing input fluid count pulses to an interaction chamber 47, a pair of symmetrically disposed output passage 43 and 45 communicating with the downstream end of interaction chamber 47, and a pair of vent passages 49 and 51 communicating with respective ones of said output passages 43 and 45. As commutating element 39 is of the bistable type, fluid appearing at input passage 41 will lock-on to one or the other of the sidewalls of interaction chamber 47 and flow to the appropriate one of output passages 43 and 45 accordingly. Output passages 43 and 45 are directly connected to passages 33 and 33' respectively of OR/NOR gates 11 and 11'.

In operation, OR output passages 21 and 21' are considered the output passages of the converter. Specifically, when OR passage 21 is conducting fluid the converter is considered to be in one of its two binary states, and when OR passage 21′ is conducting fluid the converter is considered to be in the other of its two binary states. Let us arbitrarily assume that before receipt of an input count pulse at passage 21 OR/NOR gate 11′ is in its NOR condition whereby fluid from power nozzle 13′ is conducted directly to output passage 19′. The fluid in passage 19′ is conducted across region 35 to passage 29 which in turn conducts the fluid to control nozzle 15 of OR/NOR gate 11. The fluid received at control passage 15 is at a sufficient pressure level to maintain deflection of the power stream issuing from power nozzle 13 toward OR passage 21. Control nozzle 15 has a smaller cross-section than feedback passage 29 so that control nozzle 15 cannot accommodate all of the fluid flowing in passage 29; and a back pressure is developed upstream of control nozzle 15.

As indicated, the power stream of OR/NOR gate 11′ is flowing to output passage 19′ and in the process tends to aspirate the interaction region of gate 11′ adjacent the control nozzle 15′, thereby causing the pressure in such region to decrease. The combination of above-ambient pressure at control nozzle 15 and below-ambient pressure at control nozzle 15′ produces a fluid flow from control nozzle 15 via input passage 33 of OR/NOR gate 11, output passage 43, interaction chamber 47, and output passage 45 of commutative element 39, and input passage 33′ of OR/NOR gate 11′ to control passage 15′. This fluid flow between control nozzle 15 and the control nozzle 15′ is at a pressure level which is not sufficient to cause switching of the power stream issuing from power nozzle 13′ of OR/NOR gate 11′. The flow can be limited in this regard by appropriately designing the cross-section of the passages 33, 43, 45, and 33′ relative to the cross-sections of nozzles 15 and 15′. However, the flow between control nozzles 15 and 15′ is sufficient to prime commutating element 39 so that an incoming count pulse at input passage 41 is positively directed to output passage 45. In addition, the existence of the priming flow at control nozzle 15′ provides a force acting counter to that produced between the power stream and the sidewall adjacent nozzle 15′. As mentioned above, this force is insufficient to deflect the power stream but it does act to raise the boundary layer pressure closer to the switching pressure than otherwise would be the case whereby only a relatively small additional pressure is required to effect deflection. Thus the priming flow, in addition to priming commutating element 39 serves as a pre-bias signal which enables the utilization of count pulses of a predetermined level to affect faster response time in power stream switching than otherwise would be the case.

When a count pulse is introduced at passage 41, it is conducted to output passage 45 in the manner described above. The count pulse is received at control nozzle 15′ and effects a power stream deflection from output passage 19′ to output passage 21′ thereby changing the state of the converter. The removal of the power stream from output passage 19′ in turn removes the input signal previously applied to the control nozzle 15 of OR/NOR gate 11 via feedback passage 29. With the removal of such input signal, the power stream of OR/NOR gate 11 reverts to NOR passage 19 from which it is conducted across region 35 to passage 29′ and in turn to control nozzle 15′ where it maintains gate 11′ in its OR condition; that is, with the power stream directed toward output passage 21′. For this logic condition of the converter, there is a priming flow existing from nozzle 15′ to nozzle 15. Specifically, because of the back pressure condition created at control nozzle 15′ by the signal applied via passage 29′, and because of the low pressure condition existing at control nozzle 15 due to the aspiration action of the power stream of OR/NOR gate 11, a priming flow is produced from control nozzle 15′ along the path defined by the passages 33′, 45, interaction chamber 47, passages 43, 33 and the control nozzle 15. The action of the priming flow in both priming commutative element 39 to conduct the next pulse towards OR/NOR gate 11 and biasing the power stream of OR/NOR gate 11 so as to permit effective switching with a relatively low level additional input signal proceed in an identical manner to that described above. It may thus be readily appreciated that upon application of successive count pulses to input passage 41 of commutative element 39, output fluid flow will alternate between output passages 21 and 21′. Upon termination of each input pulse the priming flow develops and biases commutative element 39 so that the next succeeding count pulse is properly directed to effect a change of state in the converter.

Figure 2:
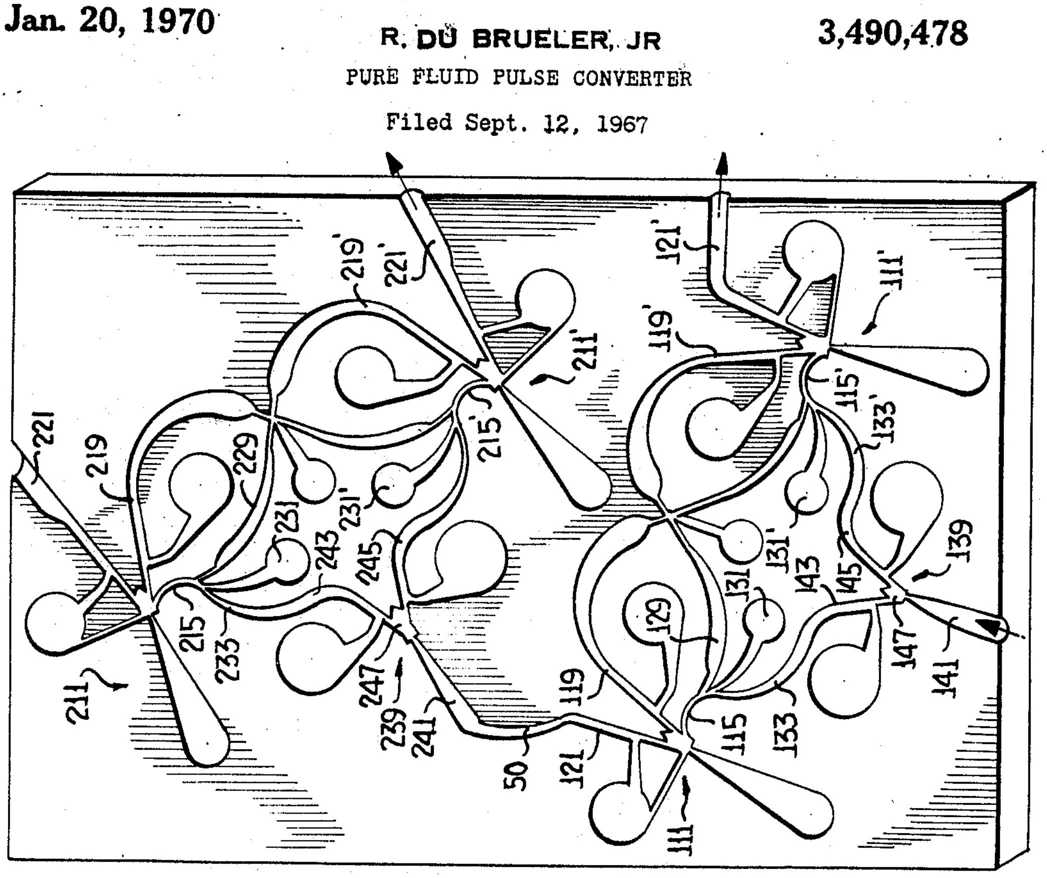
FIGURE 2 is a plan view of a pair of converter stages of the present invention connected in cascade to comprise a two-stage binary counter.

Referring now specifically to FIGURE 2, there is illustrated a pair of converters identical to the converter illustrated in FIGURE 1, the pair being cascaded so as to comprise a two stage binary counter. The elements comprising stage 1 are designated by reference characters identical to those employed in the embodiment of FIGURE 1 but are preceded by the numeral 1. The elements comprising stage 2 are identical to the elements in the embodiment of FIGURE 1 and are designated by the same reference characters preceded by the numeral 2. Stages 1 and 2 are interconnected by means of a fluid passage 50 interconnecting output passage 121 of stage 1 and input passage 241 of stage 2. Similarly, if a third stage were employed the output passage 221 would be connected to the input port of the third stage. The output passages 121′ and 221′ are considered the output passages for the counter and are connected to appropriate logic or utilization devices (not illustrated). Thus for purposes of the following description output passages 121, 221 are considered binary zero outputs and the output passages 121′ and 221′ are considered binary one outputs.

In operation, assuming the counter to be in a reset stage whereby all counter stages are in a binary zero condition, the power stream of OR/NOR gate 111 is directed towards OR passage 121 and the power stream in OR/NOR gate 111′ is directed toward NOR passage 119′. As discussed above, in relation to FIGURE 1 the flow in OR passage 121 of OR/NOR gate 111 is maintained by the flow in NOR passage 119′ via feedback passage 129 and control nozzle 115. In addition, a priming flow between control nozzle 115 and control nozzle 115′ is provided via the output passages 143 and 145 of commutating element 139. The output flow at OR passage 121 is connected via passage 50 to input passage 241 of commutating element 239 in stage 2. This signal is fed to control nozzle 215 to maintain power stream flow in stage 211 directed toward output passage 221. Stage 211′ has no input signal applied thereto so that output flow is directed to NOR passage 219′ and in turn to control passage 215 via passage 229. There is no priming flow in stage 2 under these circumstances since there is input fluid flowing from passage 241 through passage 243 to block the priming flow.

The priming flow in stage 1 directs an incoming count pulse at passage 141 toward control nozzle 115′ of OR/NOR gate 111′. As a result the power stream of OR/NOR gate 111′ is switched from NOR passage 119′ to OR passage 121′ to provide a binary 1 output signal for stage 1. Removal of the power stream from NOR passage 119′ in turn removes the feedback signal from control nozzle 115 thereby permitting the power stream in OR/NOR gate 111 to return to NOR passage 119. As a result of the flow in passage 119, a feedback signal is provided at control nozzle 115′ to switch OR/NOR gate 111′ to its binary one condition whereby fluid is conducted to OR passage 121′. Upon termination of the input count pulse at passage 141 a priming flow develops between control nozzle 115′ and control nozzle 115 via the output passages of commutative element 139 so that a subsequent count pulse is biased toward OR/NOR gate 111. As a result of the change in stage 1 the fluid signal previously applied at passage 241 from OR passage 121 is removed but no change of state is effected in stage 2 since a feedback signal remains at control nozzle 215 from feedback passage 229 to maintain OR/NOR gate 211 in its OR condition with fluid directed toward output passage 221. However, removal of the input signal from passage 241 permits the priming flow between control nozzle 215 and 215' to develop via the output passages 243 and 245 of commutating element 239. Thus, control nozzle 215' receives a pre-bias signal in the form of priming flow to enable it to readily change logic states upon receipt of the next input signal at passage 241.

Upon occurrence of a second count pulse at input passage 141 of stage 1 the pulse is directed towards control nozzle 115 of OR/NOR gate 111 by the priming flow existing between control nozzle 115' and 115. This second count pulse causes a switching of OR/NOR gate 111 to its OR condition with fluid conducted to passage 121. This, of course, releases the feedback signal provided at control nozzle 115' by the previously existing output flow at NOR passage 119, thereby permitting OR/NOR gate 111' to revert to its NOR condition whereby a feedback signal is provided at control nozzle 115 from NOR passage 119'. The fluid flowing in OR passage 121 has its effect at input passage 241 of stage 2 in that the fluid is directed towards control nozzle 215' of OR/NOR gate 211' by the priming flow existing between control nozzle 215 and 215' via the output passages of commutating element 239. As a result the power stream of OR/NOR gate 211' is switched from NOR passage 219' to OR passage 221' thereby effecting a change of logic condition in said OR/NOR gate and a change of state in stage 2. The power stream of OR/NOR gate 211 is no longer held in its OR passage 221 by the latching signal previously provided by means of passages 219' and 229 at control nozzle 215 and therefore reverts to its NOR passage 219 from which it is conducted to control nozzle 215' to latch OR/NOR gate 211' in its OR condition.

Thus it may be seen that stage one changes binary states with each count pulse and stage two changes binary states on alternate count pulses, that is upon receipt of a fluid signal from OR passage 121 of stage 111. Consequently, a two stage counter is provided which can be expanded to any number of stages by interconnecting the passages 121, 221 to the input passages 241, etc. in succeeding stages.

The counter described above and illustrated in FIGURE 2 may be reset to the ON condition (all stages binary one) or the OFF condition (all stages binary zero). To reset the counter to the ON condition, all that is required is to apply a reset pulse to reset input passage 31' of each stage; that is, reset input passages 131', 231'. Such an operation simply switches the power streams of gates 111' and 211' to OR passages 121' and 221', respectively. In this condition there can be no feedback signal holding the power stream of gates 111 and 211 in their OR output passages (121, 221) and the power stream reverts to the NOR passages 119 and 219 respectively. The NOR signal from gates 111 and 211 are fed back to latch gates 111' and 211' in their OR conditions, so that upon removal of the reset pulse stages 1 and 2 remain in their ON or binary one states.

Resetting the counter to its OFF condition, wherein all stages are set to their binary zero states, is somewhat more involved than resetting the counter to its ON condition. Specifically, if reset to OFF condition were attempted by merely applying reset pulses to passages 131, 231, the power streams in stages 111 and 211 would initially be switched to output passage 121 and 221 respectively. However, the simultaneous switching of these stages would be followed by the receipt of a signal at input passage 241 of stage two from OR passage 121 of stage one, such signal being directed by the existing priming flow between control nozzle 215 and 215' to stage 211', thereby reswitching gate 211' and in turn gate 211 to return stage 2 to the ON condition. To avoid this problem the counter may be reset to its OFF condition by first resetting the counter to its ON condition as described above; namely by applying the reset pulse to reset input passages 131', 231' etc. With the counter set in the ON condition, that is with all stages in the binary one state, a delayed portion of the reset pulse is applied to input passage 141 of the first stage. This in effect propagates a single count through the counter in accordance with normal counting sequence. Consequently, all of the stages are reset to the OFF condition by the delayed portion of the reset pulse.

While I have described and illustrated one specific embodiment of my invention, it will be clear that variation of the details of construction which are specifically illustrated and described may be resorted to without departing from the spirit and scope of the invention.

I claim:

1. A fluid pulse converter for converting sequential fluid input pulses into alternating fluid output signals, said converter comprising:

a pair of fluid logic gates, each having at least one input passage and first and second output passages, said first output passage providing a first logic signal in response to a signal at said input passage, and second output passage providing a second logic signal in the absence of a signal at said input passage, said first and second logic signals signifying respective first and second binary states of said logic gates;

connecting means for maintaining said logic gates in opposite binary states;

input means for coupling said input pulses to the input passages of said pair of logic gates;

priming means, responsive to the binary states of said logic gates, for controlling said input means to direct said input pulses toward the input passage of the logic gate in said second binary state and away from the input passage of the logic gate in said first binary state.

2. The fluid pulse converter according to claim 1 wherein said priming means includes a fluid flow path between the input passages of said fluid logic gates.

3. The fluid pulse converter according to claim 2 wherein said pair of logic gates are formed in a common plane; and wherein said connecting means comprises: a first fluid passage connecting the second output passage of one of said pair of fluid logic gates to said input passage of the other of said pair of fluid logic gates, a second fluid passage connecting the second output passage of said other of said pair of fluid logic gates to said input passage of said one of said pair of fluid logic gates, said first and second fluid passages being co-planar with said pair of fluid logic gates and intersecting in a common region, and means for venting said common region to prevent fluid flowing in said first fluid passage from flowing in said second fluid passage and to prevent fluid flowing in said second fluid passage from flowing in said first fluid passage.

4. A fluidic binary counter comprising at least first and second fluid pulse converter stages according to claim 3, and further comprising interstage connection means for providing a fluid flow connection between the first output passage of one of said fluid logic gates in said first converter stage and the input means of said second converter stage.

5. The fluid pulse converter according to claim 1 wherein said connecting means comprises a fluid passage interconnecting said second output passage of each of said logic gates and the input passage of the other of said logic gates.

6. The fluid pulse converter according to claim 5 wherein said input means comprises a fluidic element having an input passage for receiving said input pulses, an interaction chamber, a flow divider located at the downstream end of said interaction chamber, and a pair of output passages each connected to an input passage of a respective one of said logic gates.

7. The fluid pulse converter according to claim 6 wherein said priming means is a fluid flow path between the input passages of said logic gates and includes said output passages and interaction chamber of said fluidic element, said fluid flow path conducting a fluid priming signal from the input passage of whichever logic gate is in said first binary state to the input passage of the other logic gate, wherein said priming signal is at a pressure which is insufficient to effect a change in binary states at said other logic gate.

8. A fluidic binary counter comprising at least first and second fluid pulse converter stages according to claim 1, and further comprising interstage connection means for providing a fluid flow connection between the first output passage of one of said fluid logic gates in said first converter stage and the input means of said second converter stage.

9. A fluid pulse converter for converting sequential fluid input pulses into alternating fluid output signals, said converter comprising:

a pair of fluid logic gates, each having at least one input passage and first and second output passages, said first output passage providing a first logic signal in response to a signal above a predetermined pressure at said input passage, said second output passage providing a second logic signal in the absence of a signal above said predetermined pressure at said input passage, said first and second logic signals signifying respective first and second binary states of said logic gates;

fluid passage means for connecting the second output passage of each of said logic gates to the input passage of the other of said logic gates;

bias means for providing a signal below said predetermined pressure at the input passage of whichever of said logic gates is in said second binary state;

means for conducting said input pulses to the input passage of whichever of said logic gates is in said second binary state.

10. The fluid pulse converter according to claim 9, wherein said bias means includes a fluid flow path between the input passages of said logic gates, the flow therein being reversible in accordance with the binary states of said logic gates.

11. The fluid pulse converter according to claim 9 wherein said first and second fluid passage means are formed co-planar with said logic elements.

12. The fluid pulse converter according to claim 11 wherein said first and second fluid passage means intersect at an enclosed common region, said common region having a first input port and first output port arranged in substantial alignment and comprising part of said first fluid passage means, a second input port and second output port in substantial alignment and comprising part of said second fluid passage means, and a vent port disposed intermediate said first and second output ports and communicating with ambient pressure, said vent port having a sufficiently large cross-section relative to the cross-sections of said input and output ports to exhaust all fluid supplied by said first input port and not accommodated at said first output port and all fluid supplied by said second input port and not accommodated by said second output port.

13. A fluid pulse converter for converting sequential fluid input pulses into alternating fluid output signals, said converter comprising:

first and second fluidic OR/NOR gates each comprising a power nozzle for issuing a power stream of fluid, a control nozzle for issuing a fluid control signal in interacting relation with said power stream, an OR output passage for conducting said power stream fluid in response to at least a predetermined pressure at said control nozzle, and a NOR output passage for conducting said power stream fluid in the absence of at least said predetermined pressure at said control nozzle;

fluid interconnection means for connecting said NOR output passage of each of said OR/NOR gates to the control nozzle of the other of said OR/NOR gates, wherein a NOR signal provided by either of said gates provides a control signal above said predetermined pressure at the other of said gates;

input means for receiving said fluid input pulses; and priming means for conducting said input pulses from said input means to said control nozzles in alternating relation.

14. The fluid pulse converter according to claim 13:

wherein said input means comprises a fluid commutating element having an input passage for receiving said fluid input pulses and a pair of output passages disposed downstream of and symmetrically with respect to said input passage;

wherein said priming means comprises a pair of fluid passages connecting respective ones of said commutating element output passages to a respective OR/NOR gate control nozzle;

wherein said control nozzles have sufficiently small cross-sections relative to the cross-sections of said fluid interconnection means and said pair of fluid passages to cause a back pressure to be developed at the control nozzle whichever of said gates is conducting an OR output signal;

and wherein the control nozzle of whichever of said logic gates conducts a NOR output signal is aspirated by the power stream of such gate to reduce the pressure in such control nozzle;

whereby, said back pressure and said reduced pressure are cumulative to provide a fluid flow between the control nozzles through the output passages of said commutating element in the direction of the control nozzle of whichever of said gates is conducting a NOR output signal, said fluid flow deflecting said input pulses in said direction.

15. A fluidic binary counter comprising at least first and second fluid pulse converter stages according to claim 14 and further comprising means for providing a fluid flow connection between OR output passage of the first fluidic OR/NOR gate of said first converter stage and the input passage of fluid commutating element of said second converter stage.

References Cited

UNITED STATES PATENTS

| | | | |
|---|---|---|---|
| 3,117,593 | 1/1964 | Sowers | 137—815 XR |
| 3,193,197 | 7/1965 | Bauer | 137—815 XR |
| 3,199,782 | 8/1965 | Shinn | 137—815 XR |
| 3,338,515 | 8/1967 | Dexter | 137—815 XR |
| 3,348,562 | 10/1967 | Ogren | 137—815 |
| 3,369,557 | 2/1968 | Wood | 137—815 |
| 3,376,882 | 4/1968 | Schoppe et al. | 137—815 |
| 3,399,829 | 9/1968 | Richards et al. | 137—815 XR |

SAMUEL SCOTT, Primary Examiner

U.S. Cl. X.R.

235—201